US005704616A

United States Patent [19]
Huff et al.

[11] Patent Number: 5,704,616
[45] Date of Patent: Jan. 6, 1998

[54] LEVER ACTUATED KEYLESS CHUCK

[75] Inventors: Robert O. Huff, Piedmont, S.C.; Louis M. Shadeck, Timonium, Md.; Richard L. Marcengill, Walhalla, S.C.

[73] Assignee: Power Tool Holders Incorporated, Wilmington, Del.

[21] Appl. No.: 674,462

[22] Filed: Jul. 2, 1996

Related U.S. Application Data

[63] Continuation of Ser. No. 479,468, Jun. 7, 1995, abandoned.

[51] Int. Cl.$^6$ ................................................. B23B 31/12
[52] U.S. Cl. ............................ 279/62; 279/140; 279/902
[58] Field of Search ............................ 279/60–65, 140, 279/902

[56] References Cited

U.S. PATENT DOCUMENTS

| | | |
|---|---|---|
| 1,473,488 | 11/1923 | McConnell . |
| 1,970,056 | 8/1934 | O'Flaherty . |
| 2,458,626 | 1/1949 | Norige ............................ 279/62 |
| 3,000,642 | 9/1961 | Kawasaki ........................ 279/62 |
| 3,311,384 | 3/1967 | Kawasaki ........................ 279/62 |
| 3,589,486 | 6/1971 | Kelch . |
| 3,807,745 | 4/1974 | Bent . |
| 5,009,439 | 4/1991 | Sakamaki . |
| 5,215,317 | 6/1993 | Jordan et al. . |
| 5,378,002 | 1/1995 | Rohm ............................ 279/62 |
| 5,411,275 | 5/1995 | Huff et al. . |
| 5,435,578 | 7/1995 | Rohm ............................ 279/62 |
| 5,499,828 | 3/1996 | Salpaka et al. ............... 279/902 |
| 5,499,829 | 3/1996 | Rohm ............................ 279/62 |
| 5,531,461 | 7/1996 | Huff et al. . |

FOREIGN PATENT DOCUMENTS

| | | |
|---|---|---|
| 0043785A1 | 1/1982 | European Pat. Off. . |
| 63-189509 | 12/1988 | Japan . |

*Primary Examiner*—Steven C. Bishop
*Attorney, Agent, or Firm*—Dority & Manning

[57] ABSTRACT

A chuck for use with a manual or powered driver having a rotatable drive shaft including a primary tightening mechanism utilizing a three-jaw assembly actuated by a nut or tightening ring and a supplemental tightening mechanism. The supplemental tightening mechanism includes a camming portion defining a tightening cam profile. The supplemental tightening mechanism further includes a plurality of lever bars, one end of each of the lever bars forming a cam follower and the other end of each of the lever bars operatively associated with the nut so that when the supplemental tightening mechanism is actuated in a tightening direction, the lever bars will force the nut forward to produce an enhanced tightening force on the tool through the jaws. The supplemental tightening mechanism is configured to allow drive through release.

20 Claims, 7 Drawing Sheets

LEVER ACTUATED KEYLESS CHUCK

This is a continuation of application Ser. No. 08/479,468, filed Jun. 7, 1995, which was abandoned upon the filing hereof.

BACKGROUND OF THE INVENTION

The present invention relates generally to chucks for use with hand or power drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft of a driver. The chucks are configured so that rotation of an internally threaded tightening ring or nut that mates with external threads on the jaws forces the jaws into gripping relationship with respect to the cylindrical shank of a tool when rotated in one direction, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

It is desirable in a keyless chuck to obtain a sufficient holding force within the tightening capability of a normal user. With many of the jaw type chucks as described above, one means of enhancing holding force on a tool has been to use relatively fine threads on the jaws that mate with the nut to enhance the amount of force that can be generated. This solution has the disadvantage that a relatively large number of turns of the nut are necessary to span the range of diameters of tools that can be accepted by the chucks. In addition, friction reducing means such as bearings have been utilized to further enhance the amount of tightening force that can be generated. Further, it may be desirable to enhance the gripping force obtainable by a normal user above and beyond what is normally obtainable with currently available three-jaw chucks. One example of such a chuck is disclosed in U.S. Pat. No. 5,499,828 entitled "Lever Bar Keyless Chuck", commonly assigned to the present assignee, and whose entire disclosure is incorporated by reference herein.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a keyless chuck that is capable of enhanced gripping forces.

It is another object of the present invention to provide a keyless chuck that allows for easy and quick change of tool size throughout a wide range of tool shank diameters.

It is another object of the present invention to provide a keyless chuck that provides dual stage or supplemental tightening of the jaws.

It is a further object of the present invention to provide a chuck that allows for easy and quick release of the tool.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a chuck for use with a manual or powered driver having a rotatable drive shaft includes a generally cylindrical body member having a nose section and a tail section. The tail section is adapted to mate with the drive shaft of the driver, and the nose section has an axial bore formed therein and a plurality of angularly disposed passageways formed therethrough and intersecting the axial bore. The chuck includes a plurality of jaws slidably positioned in each of the angularly disposed passageways. Each of the jaws has a jaw face formed on one side thereof for engaging a tool to be held thereby, and threads formed on the opposite side thereof for engagement with a nut. The chuck further includes a nut rotatably mounted with respect to the body member and in engagement with the threads on the jaws. The chuck also includes a sleeve member in driving engagement with the nut so that when the sleeve member is rotated with respect to the body member, the jaws will be moved thereby. The chuck includes a supplemental tightening mechanism, which has a camming portion rotatable with respect to the body member. The supplemental tightening mechanism further includes a plurality of lever bars, one portion of each of the lever bars forming a cam follower, and another portion of each of the lever bars being operatively associated with the nut so that when the supplemental tightening mechanism is actuated by rotation of the camming portion, the lever bars will force the nut toward the nose section and thereby cause the jaws to produce an enhanced tightening force on the tool.

In accordance with the present invention, the chuck includes a means for drive-through release of the supplemental tightening mechanism. In a preferred embodiment, the means for drive-through release of the supplemental tightening mechanism includes a plurality of profiles formed in the camming portion. Each of the profiles extends radially from the axial centerline of the body member to a different radial distance than each of the other cam profiles. The camming profile includes an initial or release cam profile disposed at a least radial distance from the axial centerline of the body member than the other profiles. The camming profile includes a tightened cam profile disposed at a greater radial distance from the axial centerline of the body member than the release cam profile. The camming profile includes an outwardly sloped transition cam profile disposed at a radial distance from the axial centerline of the body member that varies gradually from the minimum radial distance of the initial cam profile to the greater radial distance of the tightened cam profile. The camming portion includes a drive-through cam profile disposed at a greater radial distance from the axial centerline of the body member than the tightened cam profile. The camming portion includes a stop cam profile disposed at a radial distance from the axial centerline of the body member that varies gradually from the radial distance of the tightened cam profile to the greater radial distance of the drive-through cam profile.

In further accordance with the present invention, the chuck includes a spring member that is configured and disposed to resiliently bias the front sleeve member toward the tail section of the body member.

In still further accordance with the present invention, the chuck includes a thrust ring disposed on the body member and extending radially from the body member. The thrust ring defines at least one mating surface configured with a spherical shape for pivotally receiving one of the lever bars. The received lever bar has a seating surface configured with a spherical shape for pivotal movement against the spherically-shaped mating surface of the thrust ring. The seating surface of the one lever bar is pivotally received in the mating surface of the thrust ring.

Other objects, features and aspects of the present invention are discussed in greater detail below.

BRIEF DESCRIPTION OF THE DRAWING

A full and enabling disclosure of the present invention, including the best mode thereof, to one of ordinary skill in the art, is set forth more particularly in the remainder of the specification, including reference to the accompanying figures, in which.

Figure 1:
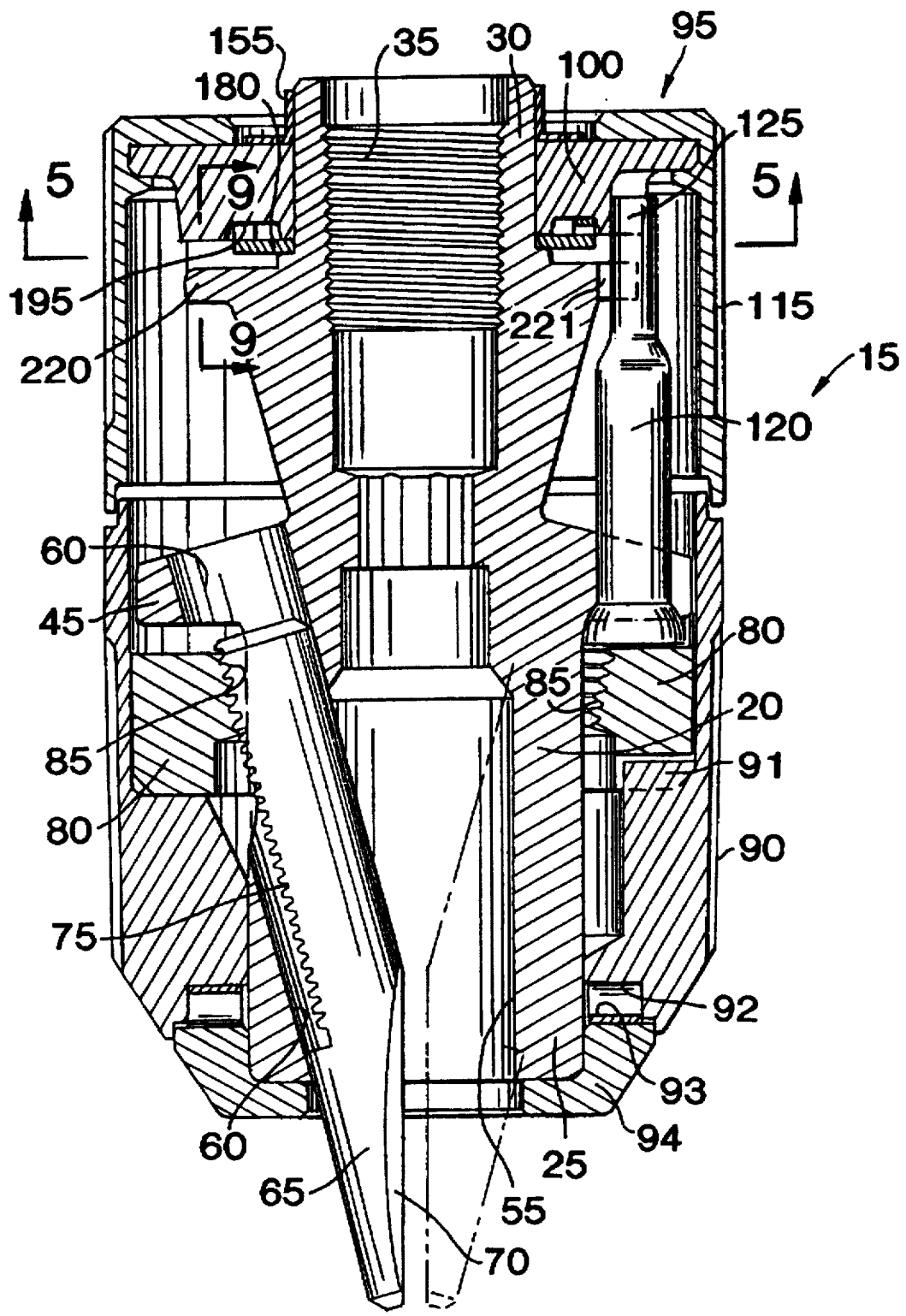
FIG. 1 is a cross-sectional view of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a chuck in accordance with an embodiment of the present invention is illustrated and generally designated with the numeral 15. While the description herein will refer to a power drill, it should be appreciated that any suitable type of device that requires a chuck could be utilized with the chuck of the present invention.

Figure 2:
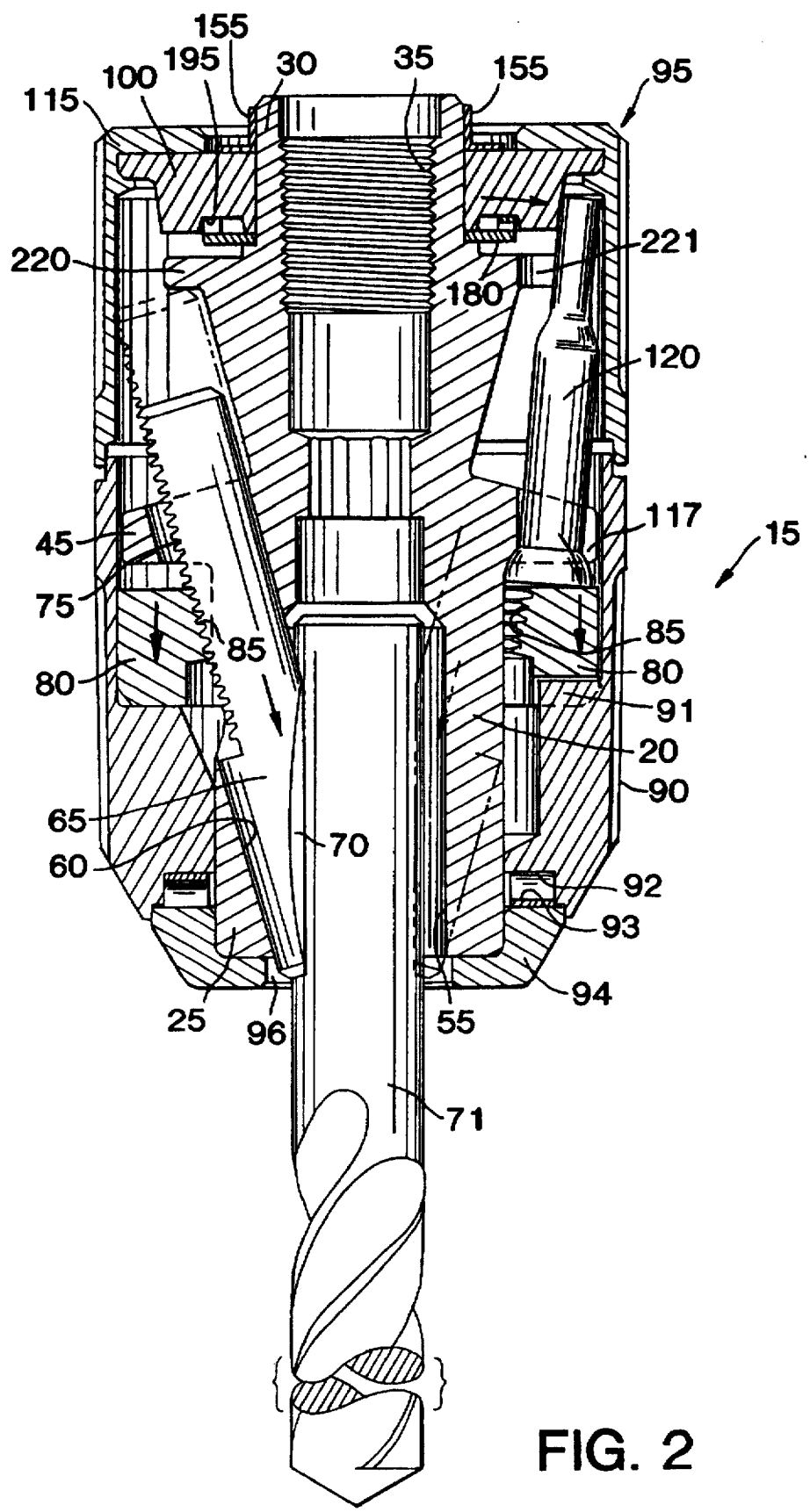
FIG. 2 is another cross-sectional view of an embodiment of the present invention.
Figure 3:
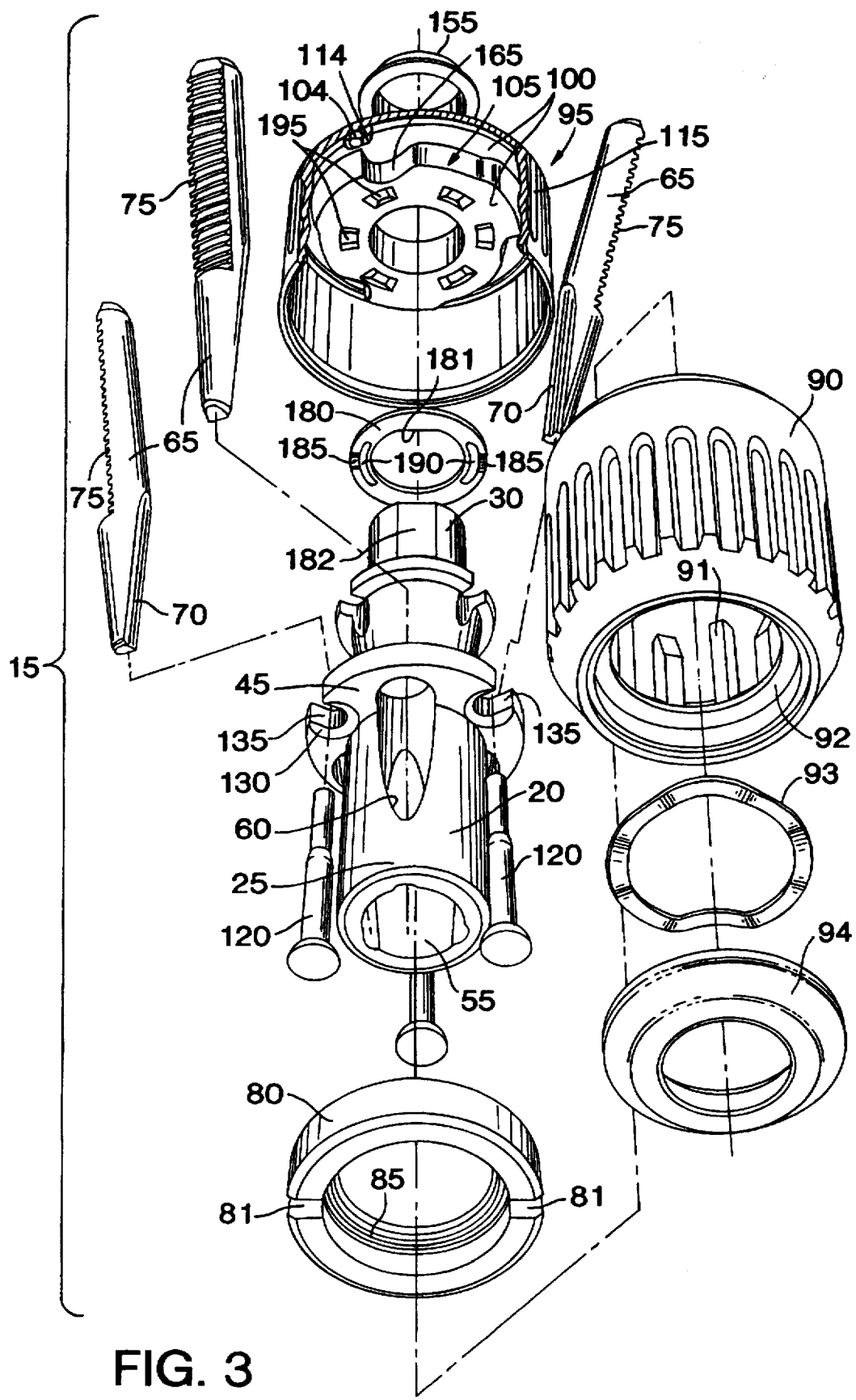
FIG. 3 is an exploded view of the chuck illustrated in FIGS. 1 and 2.

Referring to FIGS. 1 through 3, chuck 15 includes a generally cylindrical body member 20 having a nose section 25 and a tail section 30. Tail section 30 may include a threaded bore 35 for receipt of the spindle or drive shaft of a driver such as a drill. While a threaded bore is illustrated, it should be appreciated that such could be a tapered bore for attachment to a tapered spindle or any other type of attachment mechanism that would be suitable in the desired environment.

Body member 20 includes a thrust ring 45 that is integral therewith. However, it should be appreciated that thrust ring 45 could be a separate component fixed on body member 20. Nose section 25 of body member 20 defines an axial bore 55 and a plurality of angularly disposed passageways 60 formed therein and intersecting axial bore 55. Axial bore 55 is of a size sufficient to receive the largest diameter tool, such as the shank of a drill bit, that a particular size chuck is configured to accommodate.

A plurality of jaws 65 are slidably positioned in each of the angularly disposed passageways 60. Each of the jaws has a face 70 formed on one side thereof for engaging a tool, such as a drill bit shank 71 (FIG. 2), to be held thereby. Each of the jaws 65 also includes threads 75 formed on the side opposite of the jaw faces 70. In accordance with the present invention, the threads 75 on jaws 65 can be relatively coarse if desired.

A nut or tightening ring 80 with internal threads 85 is received on body 20 forward of thrust ring 45. Threads 85 on the nut engage threads 75 on the jaws so that when the nut is operated in a tightening direction, the jaws will be moved forward or toward the nose of the chuck, and when the nut is rotated in a loosening direction, the jaws will be retracted or moved toward the tail section of the chuck. Utilization of relatively coarse threads on the jaws and nut minimizes the number of rotations of the nut required to move the jaws through their full range of movement.

Nut 80 is preferably a one-piece or unitary nut. Body 20 is of a reduced diameter in the nose section 25 so that nut 80 can be received thereover. While a one-piece nut is preferred, it should be appreciated that a two-piece or broken nut could be utilized which could be held together by a band, the sleeve, spot welding or the like. As shown in FIG. 3, nut 80 includes drive dog receiving portions 81 for receipt of drive dogs located in a sleeve as will be set forth in more detail below.

Referring to FIGS. 1 through 3, a sleeve member 90 is illustrated. Since sleeve member 90 overlies nose section 25 of body member 20, it also is known as a front sleeve. Front sleeve 90 is in driving engagement with nut 80 so that when front sleeve 90 is rotated with respect to body member 20, jaws 65 will be opened or closed, depending on the direction of rotation of front sleeve 90. The driving engagement between front sleeve 90 and nut 80 can be by any known arrangement.

In a preferred embodiment, front sleeve 90 may include drive dogs 91 that engage drive dog receiving portions 81 in nut 80 to rotationally secure front sleeve 90 to nut 80. In another embodiment, front sleeve 90 could be press fitted onto the nut as is well known in the art. It should also be appreciated that front sleeve 90 could be of any known material, such as plastic, metal, or combinations thereof, as well as any suitable composite material.

In the preferred embodiment, as illustrated in FIGS. 1 through 3, front sleeve 90 is received over nose section 25 of body 20 and includes a ledge 92. A spring member 93 is received over nose portion 25 of body 20, and a retaining member 94 is pressed onto the end of nose section 25 of the body with a rearwardly-projecting portion of retaining member 94 overlying ledge 92. Spring member 93 is sandwiched between ledge 92 and retaining member 94 and serves to preload the nut 80 in the rearward direction (toward the tail section 30) through sleeve 90. Spring member 93 is preferably a wave type spring as best illustrated in FIG. 3, but could be any suitable type of spring such as a belville washer, coil spring, or the like.

Front sleeve 90 is maintained in place by retaining member 94, which may also serve as a decorative nose piece. However, it should be appreciated that retaining member 94 could be any suitable retaining member, such as a spring clip or the like. As shown in FIG. 2, retaining member 94 may also include a dust seal 96 to reduce dust and debris entering the chuck, such seal being composed of rubber, bristles or any other suitable material or configuration of material.

A chuck in accordance with a preferred embodiment of the present invention also includes a supplemental tightening mechanism. With reference to FIGS. 1 through 3, the supplemental tightening mechanism is indicated generally by the designating numeral 95 and includes a camming portion 100. As shown in FIG. 3, camming portion 100 includes a tightening cam profile indicated generally by the numeral 105. Camming portion 100 is rotatable with respect to the tail section 30 of body member 20. In a preferred embodiment, camming portion 100 is received within a rear sleeve 115 that is rotatably received on tail section 30 of body member 20.

Camming portion 100 may be integral with rear sleeve 115, pressed therein, or otherwise attached to rear sleeve 115 (as by adhesive). For a preferred embodiment, as best illustrated in FIGS. 3 and 5–7, camming portion 100 is rotationally fixed to rear sleeve 115 by locating pins 104 that protrude axially inward from the rear sleeve 115 and are received in cut-outs 114 of the camming portion 100.

As best illustrated in FIGS. 1–3, rear sleeve 115 may be retained in a rotatable manner on tail section 30 of body member 20 through a rear retaining member 155, which may be press fitted onto tail section 30 of body 20. It should be appreciated that any suitable type of retaining member could be utilized, such as, for example, a spring clip.

Figure 4:
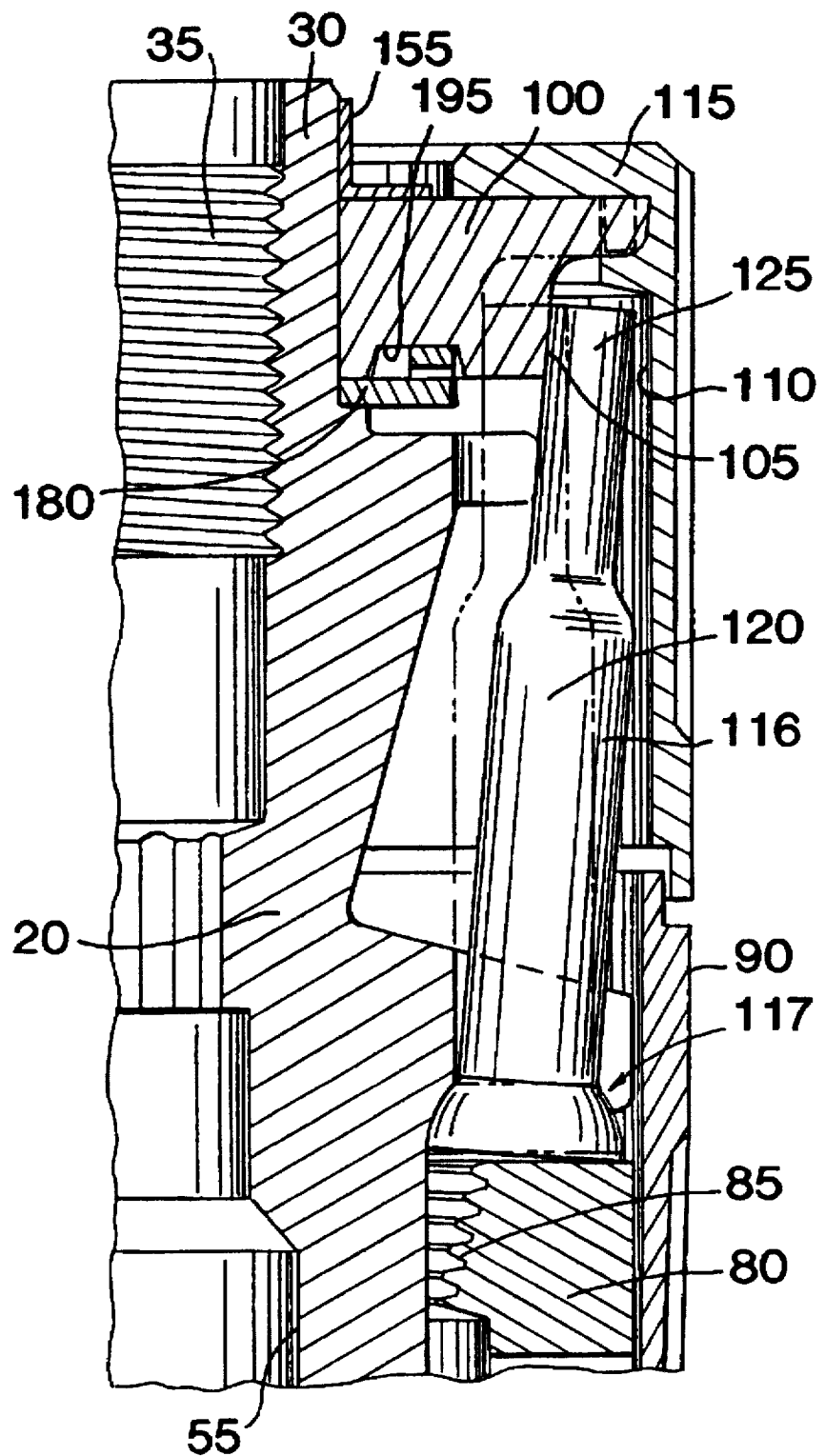
FIG. 4 is a partial cross-sectional view of a chuck in accordance with the present invention.

Referring to FIGS. 1–4 and 8, the supplemental tightening mechanism further includes a plurality of lever bars 120. As shown in FIGS. 5–8 for example, each lever bar 120 includes a cam follower portion 125 preferably located on one end thereof. Additionally, each lever bar has a portion operatively associated with nut 80 so that when the supplemental tightening mechanism is actuated by rotation of camming portion 100, each lever bar 120 will force nut 80 forward toward nose section 25 to produce an enhanced tightening force on the tool held by jaws 65. As shown in FIG. 4 for example, cam follower portion 125 is received between the surface of camming portion 100 defined by tightening cam profile 105 and the interior circumferential surface 110 of the rear sleeve 115.

Figure 8:
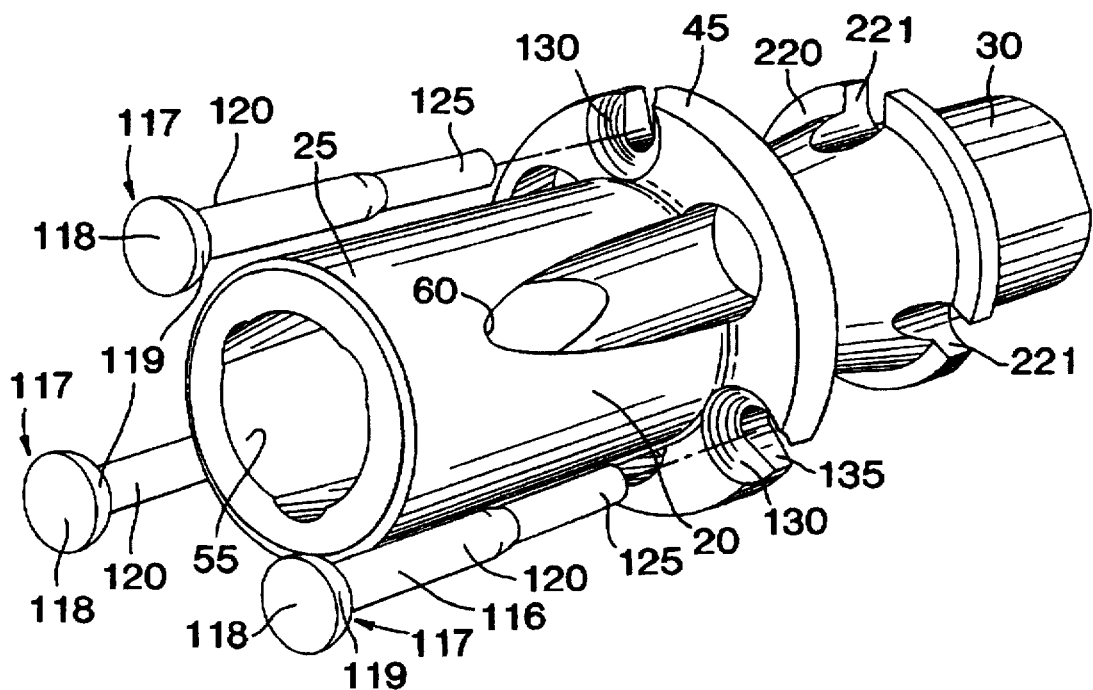
FIG. 8 is a partial exploded view of a chuck in accordance with an embodiment of the present invention.

In a preferred embodiment shown in FIG. 4 for example, each lever bar 120 includes three sections. The cam follower portion 125 is preferably substantially circular and is of a diameter less than the diameter of a middle portion 116, which connects the cam follower portion 125 to the nut contact portion 117 generally designated by the numeral 117. As shown in FIG. 8 for example, nut contact portion 117 includes a flat face 118 for contacting nut 80 and a seating surface 119 configured in a spherical shape for seating in a mating portion 130 in thrust ring 45 of body member 20. Thus, mating portion 130 also is configured in a spherical shape that corresponds to the shape of seating surface 119 so that mating portion 130 can pivotally receive seating surface 119 therein. As shown in FIGS. 3 and 8 for example, thrust ring 45 also defines a radially disposed slotted portion 135 to allow each lever bar 120 to pivot radially with respect to the axial centerline of the chuck's body member 20, but to prevent movement of the lever bar in a circumferential or tangential direction with respect to the axial centerline of the body member. Slotted portions 135 assist in preventing misalignment of the lever bars 120 during operation of the supplemental tightening mechanism.

As shown in FIGS. 1, 2 and 8, a jaw stop flange 220 serves to limit the travel of jaws 65 in the rearward or opening direction. Jaw stop flange 220 is arranged so that jaws 65 will abut the flange in their rearmost position to prevent binding between the jaws and nut 80. As shown in FIG. 2 for example, stop flange 220 includes passageways 221 to allow lever bars 120 to extend therethrough. Passageways 221 also assist in preventing undesirable circumferential movement of lever bars 120. While illustrated as unitary with body 20, it should be appreciated that stop flange 220 could be a separate component that is secured to body 20.

Figure 5:
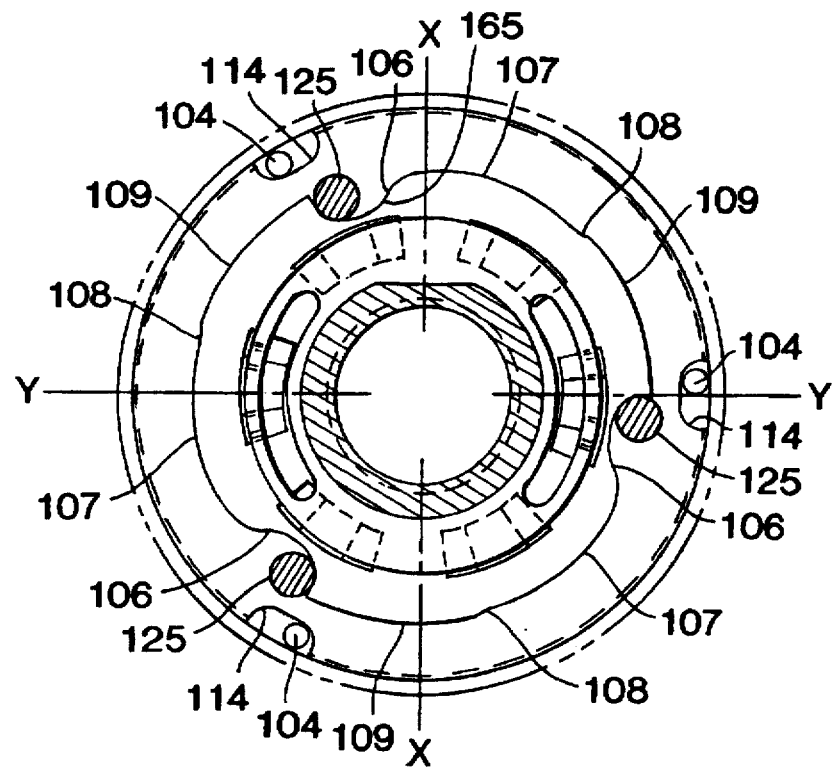
FIG. 5 is a cross-sectional view taken along the lines 5—5 of FIG. 1.
Figure 6:
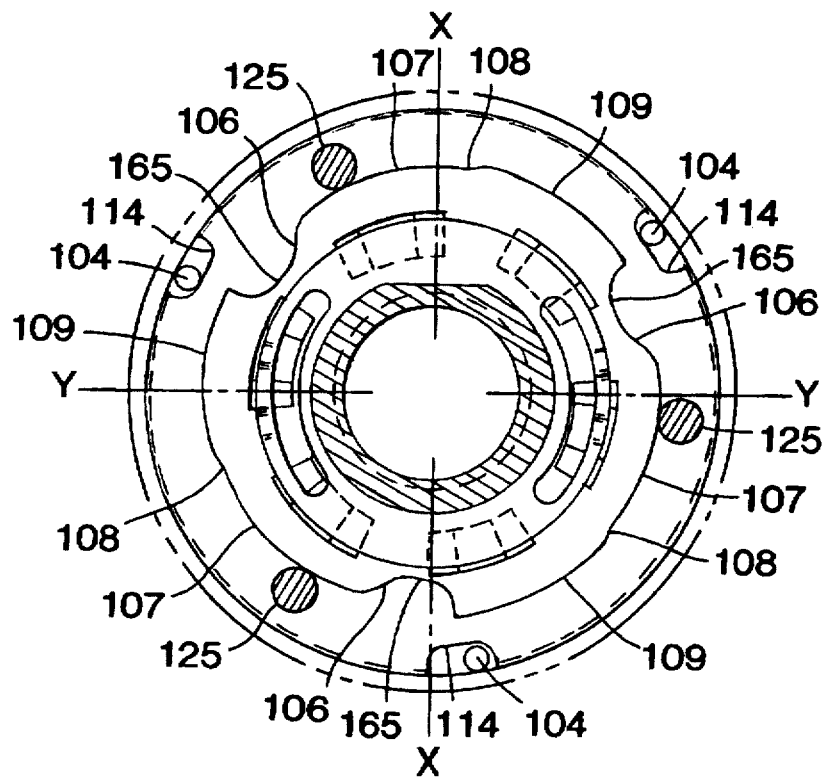
FIG. 6 is a cross-sectioned partial view of the lever mechanism of FIG. 5 showing the lever mechanism activated.
Figure 7:
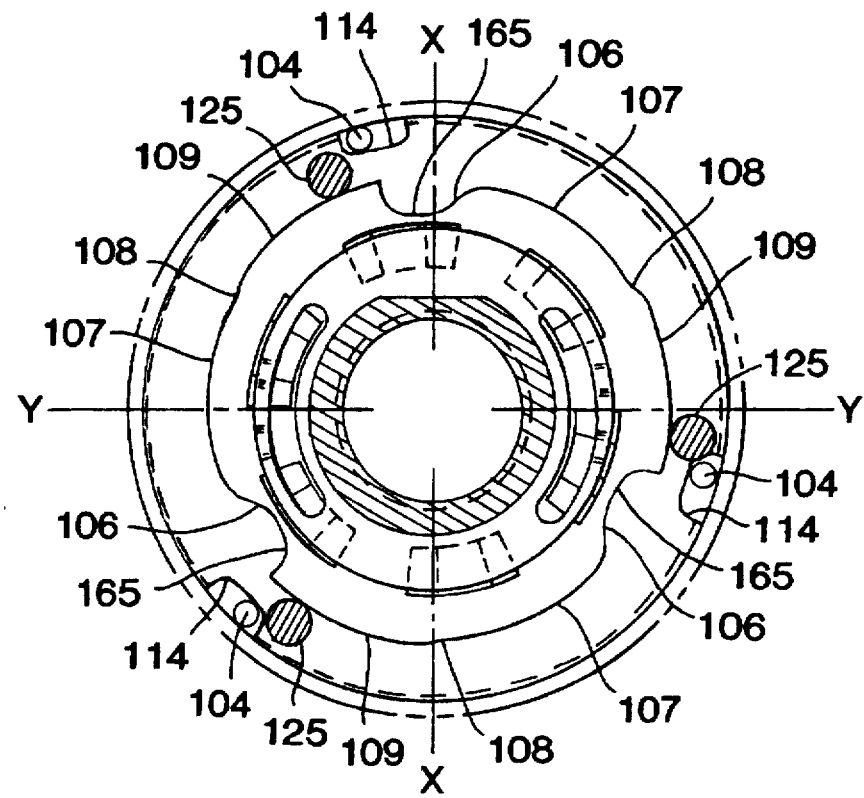
FIG. 7 is a cross-sectioned partial view of the lever mechanism of FIG. 6 showing the lever mechanism oriented at a drive-through release position.

FIGS. 5 through 7 illustrate a preferred embodiment of the camming portion 100, which includes a tightening cam profile composed of a repeating (or cyclic) plurality of particular cam profiles. Each cycle of cam profiles corresponds to one of the three lever bars 120 in the embodiment shown. Each particular cam profile in a cycle is configured to extend radially from the axial centerline of body member 20 to a different radial distance than each of the other cam profiles in that cycle of the profiles in tightening cam profile 105 of camming member 100.

The preferred tightening cam profile 105 of camming member 100 includes an initial or released cam profile indicated at 165. As shown in FIGS. 3, 6 and 7 for example, initial cam profile 165 is disposed at the least radial distance from the axial centerline of body member 20 than the other cam profiles in each cycle of profiles. As shown in FIGS. 5–7, a tightened cam profile 107 is disposed at a greater radial distance from the axial centerline of body member 20 than initial cam profile 165. Tightened cam profile 107 is a substantially uniform diameter portion. A transition cam profile 106 is disposed at a radial distance from the axial centerline of body member 20 that varies gradually from the minimum radial distance of initial cam profile 165 to the greater radial distance of tightened cam profile 107. Transition cam profile 106 is an outwardly sloped portion that causes cam follower portions 125 of lever bars 120 to move radially outwardly with respect to the axial centerline of body member 20 to the position shown in solid line in FIG. 4.

As shown in FIGS. 5–7, tightening cam profile 105 further includes a locked stop cam profile 108 disposed at a radial distance from the axial centerline of body member 20 that varies gradually from the radial distance of tightened cam profile 107 to an increasingly greater radial distance of a drive through cam profile 109 (described below). Thus, locked stop cam profile 108 forms another radially outwardly sloped portion that serves as a locked stop position for the cam follower portion 125 of lever bar 120.

In accordance with the present invention, to prevent binding, i.e., a condition where it is difficult to release the supplemental tightening mechanism, a means is provided for drive-through release of the supplemental tightening mechanism. As embodied herein and shown in FIG. 3 for example, the means for drive-through release of the supplemental tightening mechanism 95 is embodied herein by camming profile 105 being configured to include a drive-through cam profile 109 disposed at a greater radial distance from the axial centerline of body member 20 than tightened cam profile 107. As shown in FIGS. 5 through 7 for example, the cam profile 105 has been configured to allow a user to drive the rear sleeve 115 through the locked position (with cam follower portions 125 at lock stop cam profile 108) into the initial, i.e., released, position (with cam follower portions 125 at initial cam profile 165) without the necessity of reversing the direction of rotation of the rear sleeve 115. The user can accomplish this by providing additional rotational force to the rear sleeve 115 in the tightening direction after the cam follower has engaged the locked stop cam profile 108. This will cause the cam follower 125 to move up the slope of locked stop cam profile 108 to drive-through cam profile 109 and, upon continued rotation, to move to initial cam profile 165. This arrangement allows a user to essentially drive the supplemental tightening mechanism 95 through the locked position to the released position if difficulty is experienced in normal release of the supplemental tightening mechanism.

It should be appreciated that it is the functionality of the various cam profiles, not the exact shapes, that is important to certain embodiments of the present invention. Therefore any profile configuration suitable to accomplish the general movements of the cam followers would be within the scope of the present invention.

An explanation of the operation of chuck 15 proceeds as follows. In FIG. 4, broken lines are used to illustrate lever bar 120 in a released position prior to actuation of the supplemental tightening mechanism, while solid lines are used to show lever bar 120 in an actuated position of supplemental tightening mechanism 95. Reference is made to the position where lever bars 120 are in the dashed line position shown in FIG. 4 and rear sleeve 115 is in the position as illustrated in FIGS. 1 and 5, where cam follower portions 125 are located at the beginning of the tightening cam profile 105 illustrated at 165 and jaws 65 are retracted within the chuck a sufficient amount to receive the shank of a drill bit or the like. Upon rotating the front sleeve 90 in a tightening direction, which typically is clockwise if viewed from in front of the nose section of the chuck, jaws 65 will be caused to move forward until they contact the drill bit shank. Upon such contact, the shank will be retained within the jaws of the chuck. At that point, and as best illustrated in FIGS. 2 and 6, rear sleeve 115 is actuated in the tightening direction, which is generally counterclockwise, as illustrated in the embodiment of FIGS. 2 and 6. As rear sleeve 115 is actuated, the camming mechanism 100 is caused to rotate and cam follower portions 125 move along transition profile 106 of the tightening cam profile 105 and follower portions 125 are forced outwardly with respect to the axial centerline of the body member 20. As cam follower portions 125 move up the slope on the transition cam profile 106, the cam follower portions 125 move outwardly with respect to the axial centerline. The nut contact portion 117 of each lever bar 120 is caused to be pivoted with spherical surface 119 acting as the fulcrum, so that contact portion 117 acts to move nut 80 forwardly toward the nose section 25 of body member 20 and thereby providing additional tightening force through jaws 65 by virtue of the axial force placed on nut 80. In this regard, some axial movement of nut 80 is allowed by spring 93 to allow nut 80 to move forward when the supplemental tightening mechanism 95 is actuated.

In operation, as the primary tightening mechanism is actuated (i.e., rotation of nut 80 with respect to jaws 65), the jaw and nut arrangement is pre-loaded in the rearward direction. Thereafter, actuation of the supplemental tightening mechanism 95 is effective to enhance the overall holding force of the chuck. This movement continues until cam follower portions 125 reach the locked stop profile indicated at 108 in FIGS. 5-7.

When it is desired to release the drill bit or tool being held by the jaws, rear sleeve 115 is rotated in a release direction, which is opposite of the tightening direction, and cam follower portions 125 move along the interior of the rear sleeve until they are returned to their initial position at 165. If difficulty is experienced in rotating rear sleeve 115 in the release direction due to binding or the like, rear sleeve 115 can be released through the drive through mechanism by further rotation in the tightening direction as clearly described above.

Thereafter, front sleeve 90 may be rotated with respect to body member 20 in a release direction to retract jaws 65 rearwardly into the chuck to release the tool being held thereby. It should be appreciated that lever bars 120 pivot with respect to body member 20 but that the particular portion or configuration of the contact portion 117 of lever bar 120 that contacts the nut, or that may contact another component which applies force to the nut, is not critical to all embodiments of the present invention.

Figure 9:
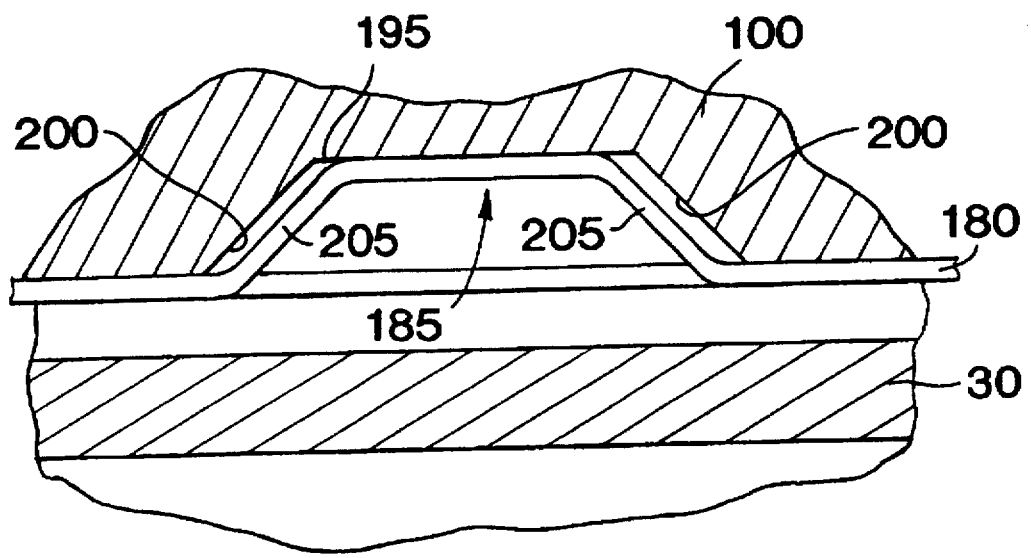
FIG. 9 is a partial cross-sectional view of the rear sleeve and resilient means taken along the lines 9—9 of FIG. 1.

In a preferred embodiment, resilient means for preventing the supplemental tightening mechanism 95 from actuating prior to closure of the jaws 65 on a tool are provided. As embodied herein, and referring to FIGS. 3, 4 and 9, resilient means may include a washer 180 secured to tail section 30 of body member 20. As shown in FIG. 3, washer 180 includes resilient portions 185 adjacent openings 190. Referring more particularly to FIG. 9, the resilient means further includes a ramp member 195 that is operatively secured to rear sleeve 115 for rotation therewith. In the embodiment shown, such operative securement is effected because ramp members 195 are formed in camming portion 100, which engages locating pins 104, which are fixed to rear sleeve 115. Ramp member 195 includes ramps 200 that bear against ramp portions 205 on washer 180.

In operation, washer 180 is fixedly attached to tail section 30 of body member 20, and ramp member 195 is fixedly attached to rear sleeve 115 for rotation therewith relative to body member 20. As embodied herein and shown in FIG. 3 for example, the internal configuration of washer 180 includes a flat portion 181, and the diameter of the tail section 30 of body member 20 is provided with a correspondingly configured flat portion 182 so that when washer 180 is placed over tail section 30, washer 180 and body 20 will move in a rotary direction as one.

As shown in FIG. 9 for example, ramps 200 of ramp member 195 engage ramp portions 205 on washer 180 and prevent rotation of rear sleeve 115 with respect to body member 20 provided ramp portions remain undeformed from their trapezoidal cross-sectional shape as shown in FIG. 3 for example. When a sufficient force is applied to rear sleeve 115, which force is transmitted through ramp member 195 to resilient portions 185 on washer 180, resilient portions 185 will deflect and allow ramps 200 to move over ramp portions 205 and thereby allow rotation of rear sleeve 115 with respect to body member 20. This structural arrangement prevents rear sleeve 115 from actuating prior to application of a desired force, which can be controlled by the resiliency of resilient portion 185 of washer 180. This ensures that the front sleeve 90 will be able to actuate jaws 65 into contact with the drill shank or the like prior to rear sleeve 115 actuating the supplemental tightening mechanism.

Figure 10:
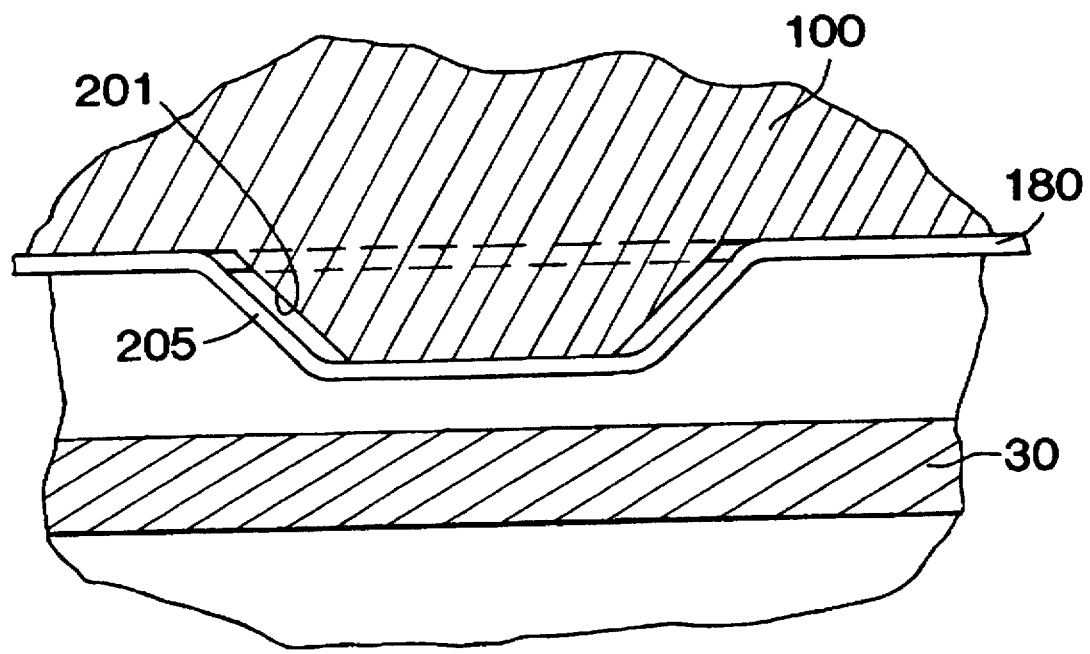
FIG. 10 is a partial cross-sectional view of a portion of a chuck in accordance with the present invention illustrating variations in the resilient means shown in FIG. 9.

It should be appreciated by one skilled in the art that, as illustrated in FIG. 10, protruding ramps 201 could be operatively associated with the rear sleeve 115 and recessed ramp portions 205 could be located formed in washer 180. The operation would be substantially as described above. It should also be appreciated that ramp members 195 or 201 could be unitary with rear sleeve 115 or a separate component and could be constructed of the same or a different material as rear sleeve 115 and/or camming portion 100. It should also be appreciated that other configurations in addition to ramps could be utilized to provide the same or equivalent function as described.

Referring to FIG. 3, various mechanisms for fixing washer 180 onto tail section 30 of body member 20 could be utilized. In one preferred embodiment, the internal diameter of washer 180 is irregularly shaped, and a portion of tail section 30 of body member 20 is also irregularly shaped in a mating configuration.

It may also be desirable to have friction reducing bearing means located between rear sleeve 115 and tail end 30 of body member 20 to reduce friction as the rear sleeve 115 turns with respect to the body member 20. Such bearing means could be of any known construction such as ball bearings with an inner race and a corresponding outer race. It should be appreciated that any suitable bearing means could be utilized including single or double roller bearings or the like, the selection of which would be well within the purview of one skilled in the art.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section adapted to mate with the drive shaft of the driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof for engaging a tool to be held thereby, and threads formed on the opposite side thereof for engagement with a nut;
   c) a nut rotatably mounted with respect to said body member and in engagement with said threads on said jaws;
   d) a sleeve member in driving engagement with said nut so that when said sleeve member is rotated with respect to said body member, said jaws will be moved thereby;
   e) a supplemental tightening mechanism configured and disposed so as to force said nut toward said nose section and thereby cause said jaws to produce an enhanced tightening force on the tool; and
   f) a means for drive-through release of said supplemental tightening mechanism.

2. A chuck for use with a manual or powered driver as in claim 1, wherein said means for drive-through release of said supplemental tightening mechanism includes a plurality of cam profiles formed in said supplemental tightening mechanism.

3. A chuck for use with a manual or powered driver as in claim 2, wherein:
   said supplemental tightening mechanism includes a camming portion rotatable with respect to said body member; and
   each said cam profile extending radially from the axial centerline of said body member to a different radial distance than each other said profile, said camming portion including an initial cam profile disposed at a least radial distance from the axial centerline of said body member than said other cam profiles, said camming portion including a tightened cam profile disposed at a greater radial distance from the axial centerline of said body member than said initial cam profile, said camming portion including a transition cam profile disposed at a radial distance from the axial centerline of said body member varying gradually from said minimum radial distance of said initial cam profile to said greater radial distance of said tightened cam profile.

4. A chuck for use with a manual or powered driver as in claim 3, wherein:
   said camming portion including a drive-through cam profile disposed at a greater radial distance from the axial centerline of said body member than said tightened cam profile, said camming portion including a stop cam profile disposed at a radial distance from the axial centerline of said body member varying gradually from said radial distance of said tightened cam profile to said greater radial distance of said drive-through cam profile.

5. A chuck for use with a manual or powered driver as in claim 3, wherein:
   said supplemental tightening mechanism includes a plurality of lever bars, one portion of each of said lever bars forming a cam follower and another portion of each of said lever bars operatively associated with said nut so that when said supplemental tightening mechanism is actuated by rotation of said camming portion, said lever bars will force said nut toward said nose section and thereby cause said jaws to produce an enhanced tightening force on the tool; and
   said transition cam profile is configured to cause said cam followers to move outwardly with respect to the axial centerline of said body member when said rear sleeve is actuated in a tightening direction and wherein said initial cam profile is configured to cause said cam followers to move inwardly with respect to the axial centerline of said body member when said rear sleeve is actuated in a release direction.

6. A chuck for use with a manual or powered driver as in claim 1, wherein
   said supplemental tightening mechanism includes a camming portion rotatable with respect to said body member, said supplemental tightening mechanism further including a plurality of lever bars, one portion of each of said lever bars forming a cam follower and another portion of each of said lever bars operatively associated with said nut so that when said supplemental tightening mechanism is actuated by rotation of said camming portion, said lever bars will force said nut toward said nose section and thereby cause said jaws to produce an enhanced tightening force on the tool.

7. A chuck for use with a manual or powered driver as in claim 1, further comprising a resilient means for preventing said supplemental tightening mechanism from actuating prior to closure of said jaws on the tool.

8. A chuck for use with a manual or powered driver as in claim 7, wherein:

said supplemental tightening mechanism includes a camming portion rotatable with respect to said body member; and said resilient means includes a first member associated with said camming portion and a second member associated with said body member, at least one of said first and second members having a resilient portion which mates with a portion of the other so as to restrain rotational movement between the two until said resilient portion is overcome.

9. A chuck for use with a manual or powered driver as in claim 8, wherein said sleeve overlies said nose section of said body member and the chuck further includes a rear sleeve, one of said first and second members being fixedly connected to said rear sleeve and the other of said first and second members being fixedly connected to said body member.

10. A chuck for use with a manual or powered driver as in claim 8, wherein said resilient portion mates with a ramp section on the other of said first and second members.

11. A chuck for use with a manual or powered driver as in claim 7, wherein said resilient means includes a first member associated with said rear sleeve and a second member associated with said body member, at least one of said first and second members having a resilient portion which mates with a portion of the other so as to restrain rotational movement between the two until said resilient portion is overcome.

12. A chuck for use with a manual or powered driver as in claim 1, wherein:

said supplemental tightening mechanism includes a camming portion rotatable with respect to said body member; and said chuck includes a rear sleeve and wherein said camming portion is operatively connected to said rear sleeve.

13. A chuck for use with a manual or powered driver as in claim 12, wherein said camming portion has a profile configured to cause said follower portion of said lever bar to move outwardly with respect to the axial center line of said body member when said rear sleeve is rotated in a tightening direction.

14. A chuck for use with a manual or powered driver as in claim 13, wherein said camming portion has a transition cam profile and an initial cam profile.

15. A chuck for use with a manual or powered driver as in claim 14, wherein said initial cam profile is configured so that when said rear sleeve is rotated in a loosening direction, said camming profile will cause the lever bars to move inwardly toward the axial centerline of the body member and thereby release the forward force on said nut caused by the lever members.

16. A chuck for use with a manual or powered driver having a rotatable drive shaft, said chuck comprising:

a) a generally cylindrical body member having a nose section and a tail section, said tail section adapted to mate with the drive shaft of the driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof for engaging a tool to be held thereby, and threads formed on the opposite side thereof for engagement with a nut;

c) a nut rotatably mounted with respect to said body member and in engagement with said threads on said jaws;

d) a front sleeve member in driving engagement with said nut and overlying said nose section of said body member so that when said front sleeve member is rotated with respect to said body member, said jaws will be moved thereby;

e) a supplemental tightening mechanism configured and disposed so as to force said nut toward said nose section and thereby cause said jaws to produce an enhanced tightening force on the tool; and f) a spring member configured and disposed to resiliently bias said front sleeve member toward said tail section of said body member.

17. A chuck for use with a manual or powered driver having a rotatable drive shaft, said chuck comprising:

a) a generally cylindrical body member having a nose section and a tail section, said tail section adapted to mate with the drive shaft of the driver, said nose section having an axial bore formed therein and a plurality of angularly disposed passageways formed therethrough and intersecting said axial bore, said axial bore being disposed symmetrically about an axial centerline;

b) a plurality of jaws slidably positioned in each of said angularly disposed passageways, each of said jaws having a jaw face formed on one side thereof for engaging a tool to be held thereby, and threads formed on the opposite side thereof for engagement with a nut;

c) a nut rotatably mounted with respect to said body member and in engagement with said threads on said jaws;

d) a front sleeve member in driving engagement with said nut and overlying said nose section of said body member so that when said front sleeve member is rotated with respect to said body member, said jaws will be moved thereby;

e) a supplemental tightening mechanism, said supplemental tightening mechanism including a camming portion rotatable with respect to said body member, said supplemental tightening mechanism further including a plurality of lever bars, one portion of each of said lever bars forming a cam follower and another portion of each of said lever bars operatively associated with said nut so that when said supplemental tightening mechanism is actuated by rotation of said camming portion, said lever bars will force said nut toward said nose section and thereby cause said jaws to produce an enhanced tightening force on the tool;

f) a thrust ring disposed on said body member and extending radially from said body member, said thrust ring defining at least one mating surface configured with a spherical shape for pivotally receiving one said lever bar; and g) wherein said one lever bar has a seating surface configured with a spherical shape for pivotal movement against said spherically-shaped mating surface of said thrust ring, said seating surface of said one lever bar being pivotally received in said mating surface of said thrust ring.

18. A chuck for use with a manual or powered driver as in claim 17, wherein said thrust ring defines a slotted portion communicating with said mating portion and configured to allow said lever bar to pivot radially with respect to said axial centerline of said body member.

19. A chuck for use with a manual or powered driver as in claim 17, wherein:

said thrust ring defines a slotted portion communicating with said mating portion and configured to allow said lever bar to pivot radially with respect to said axial centerline of said body member; and said slotted portion prevents movement of said lever bar in a circumferential direction with respect to said axial centerline of said body member.

20. A chuck for use with a manual or powered driver as in claim 17, wherein:

said thrust ring defines a slotted portion communicating with said mating portion and configured to allow said lever bar to pivot radially with respect to said axial centerline of said body member; and said slotted portion prevents movement of said lever bar in a tangential direction with respect to said axial centerline of said body member.

* * * * *